Inventor.
George R. Aschauer.
By John W Dawley
Attorney.

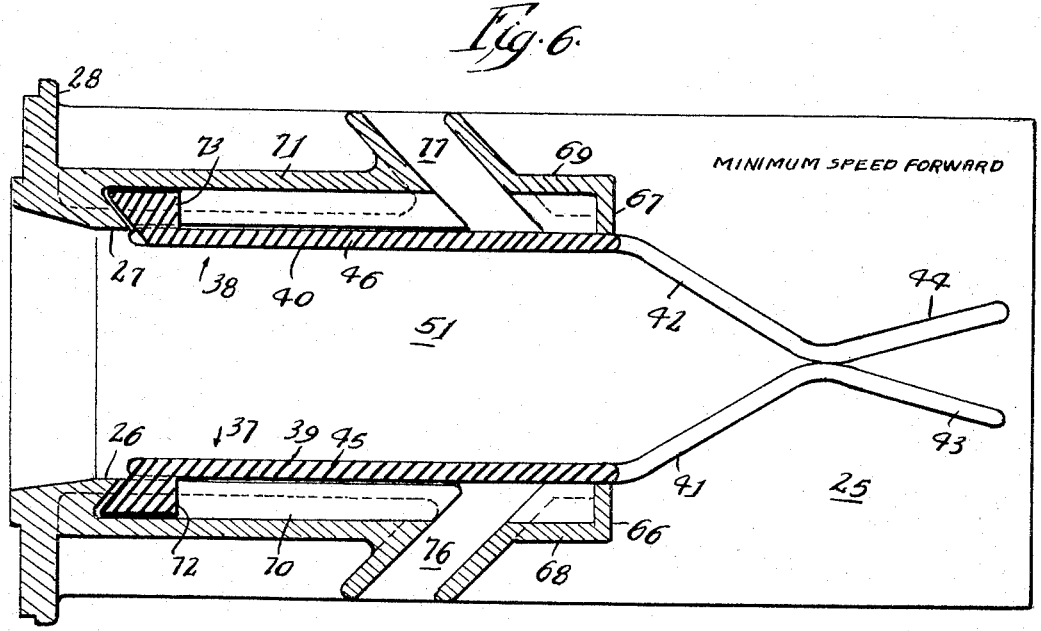
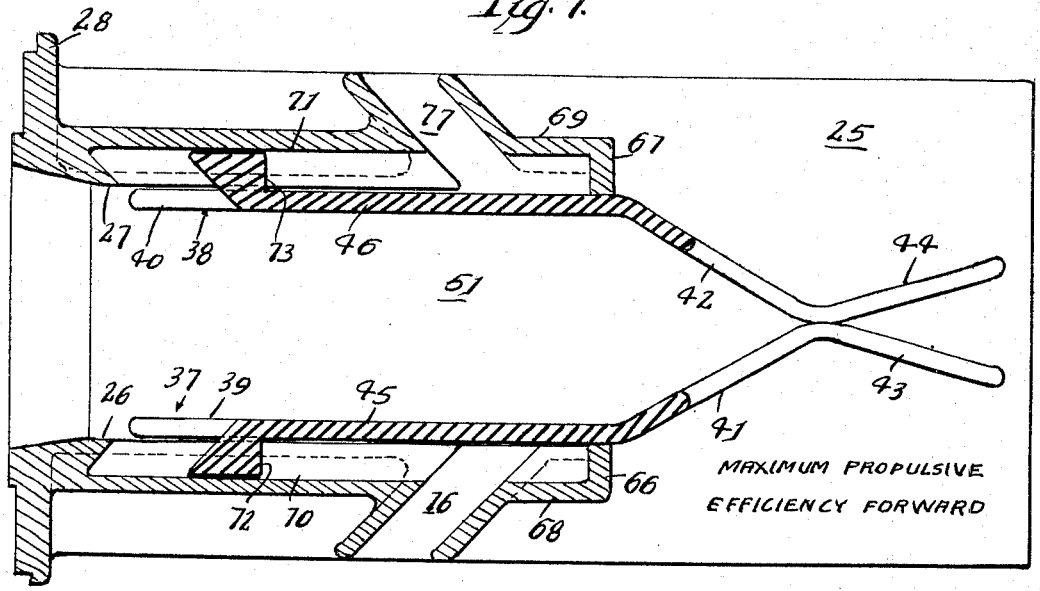

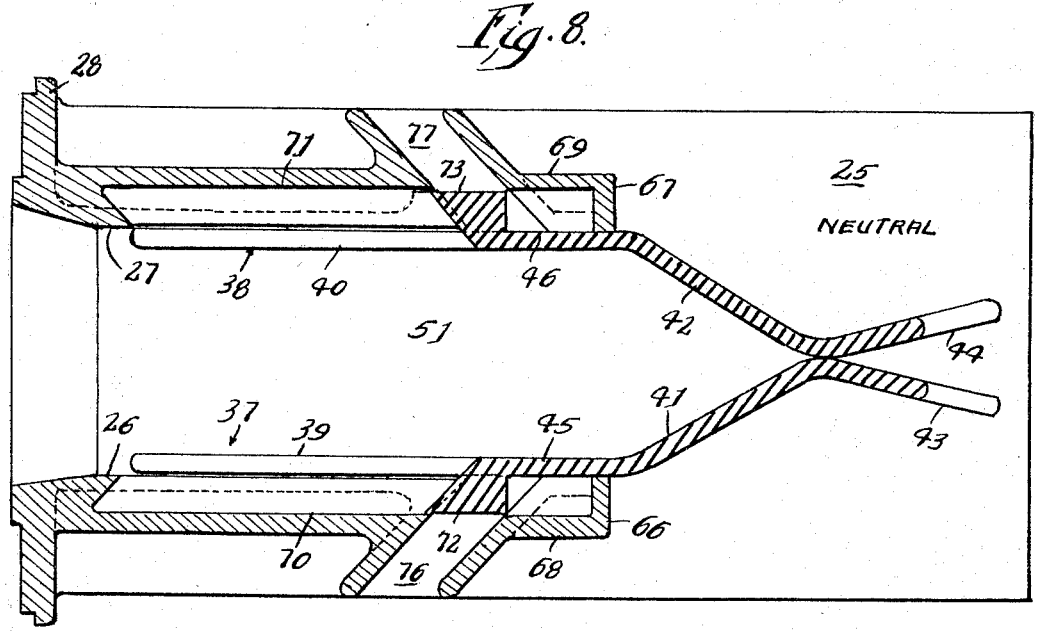
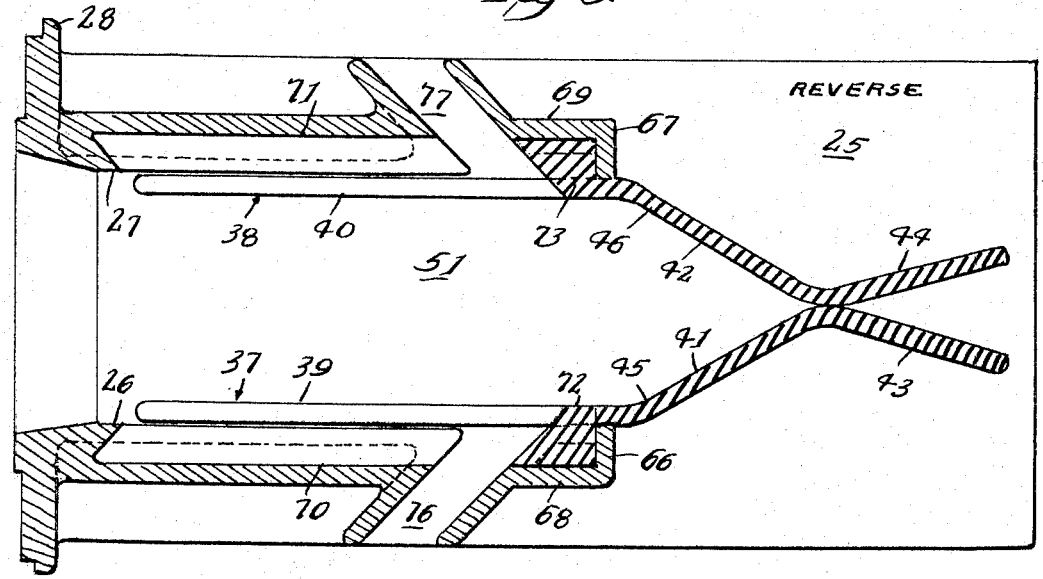

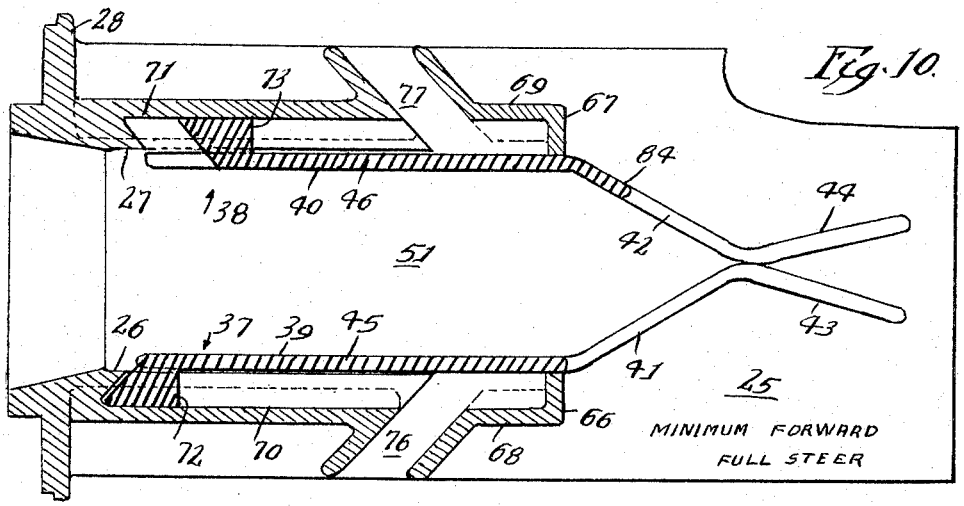
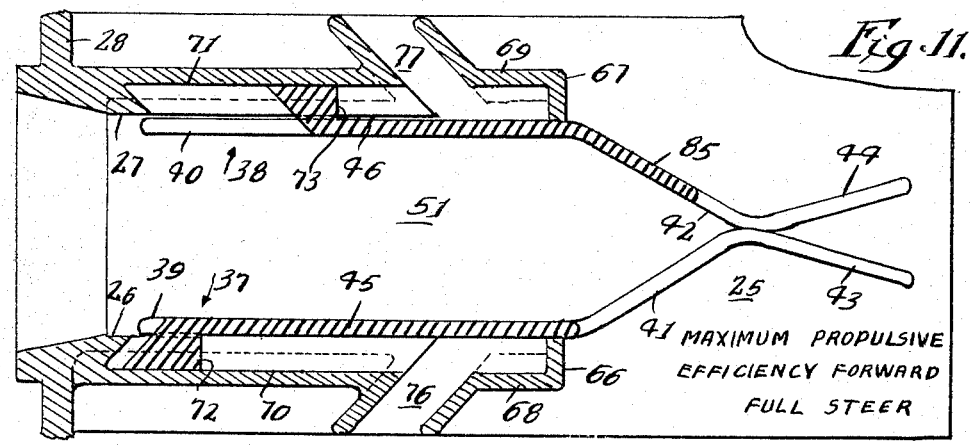
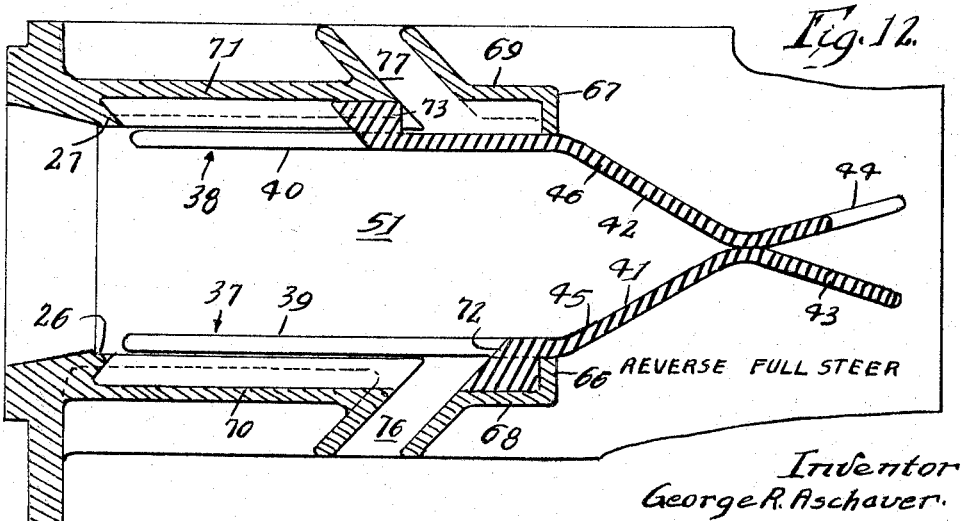

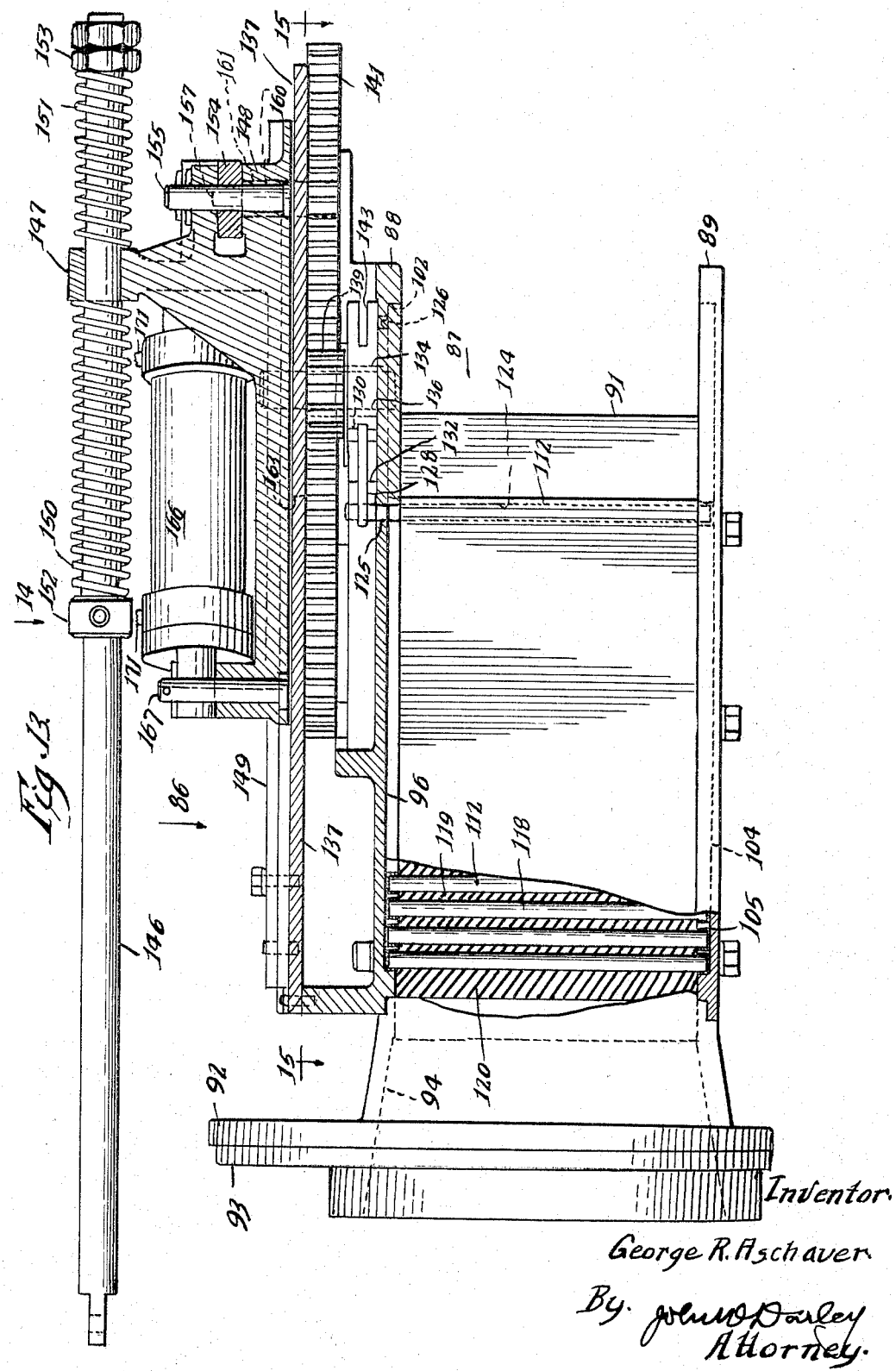

Aug. 16, 1966   G. R. ASCHAUER   3,266,242
JET PROPELLED WATER CRAFT
Filed May 17, 1963   14 Sheets-Sheet 9

Inventor.
George R. Aschauer.
By John W Bailey
Attorney.

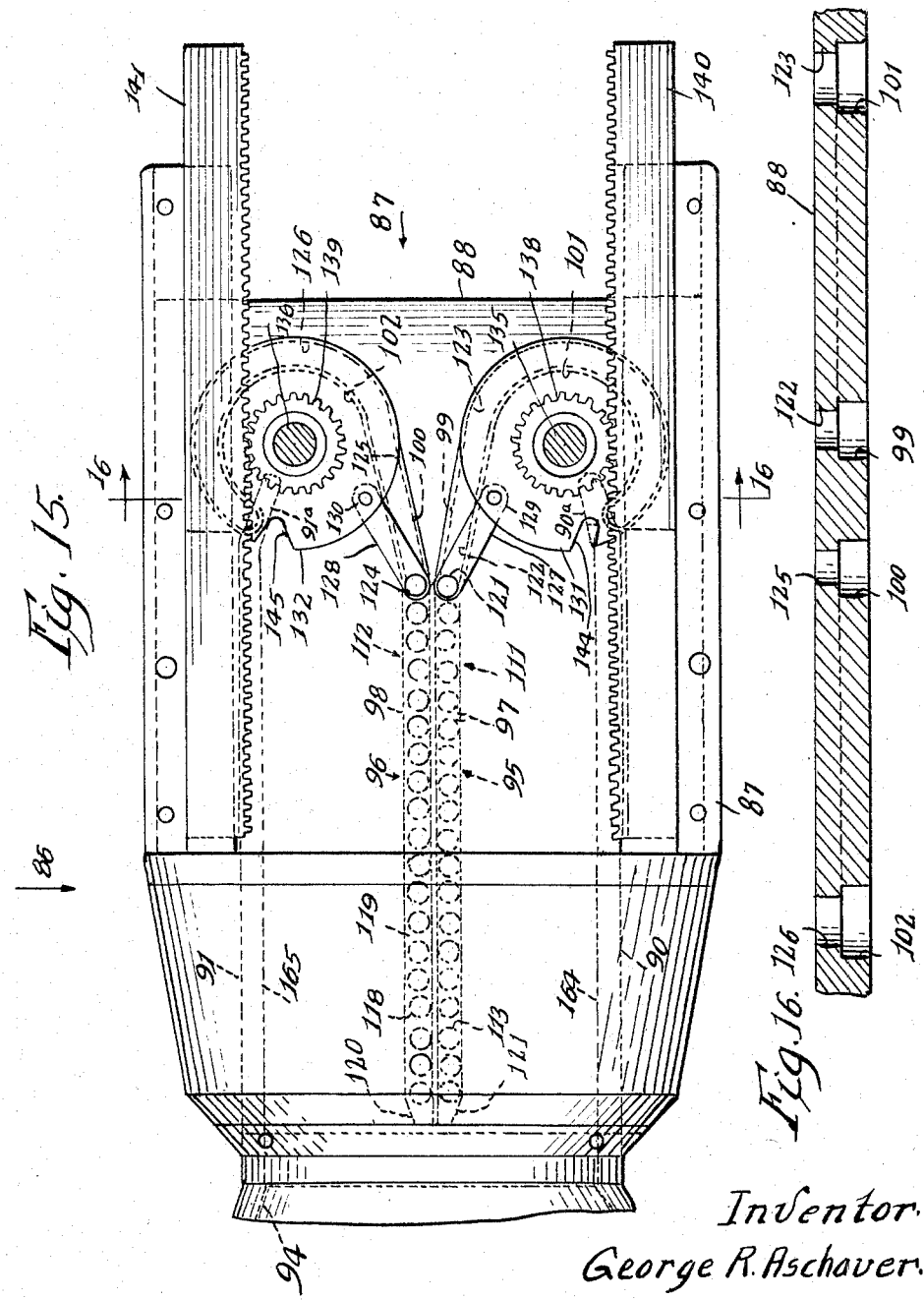

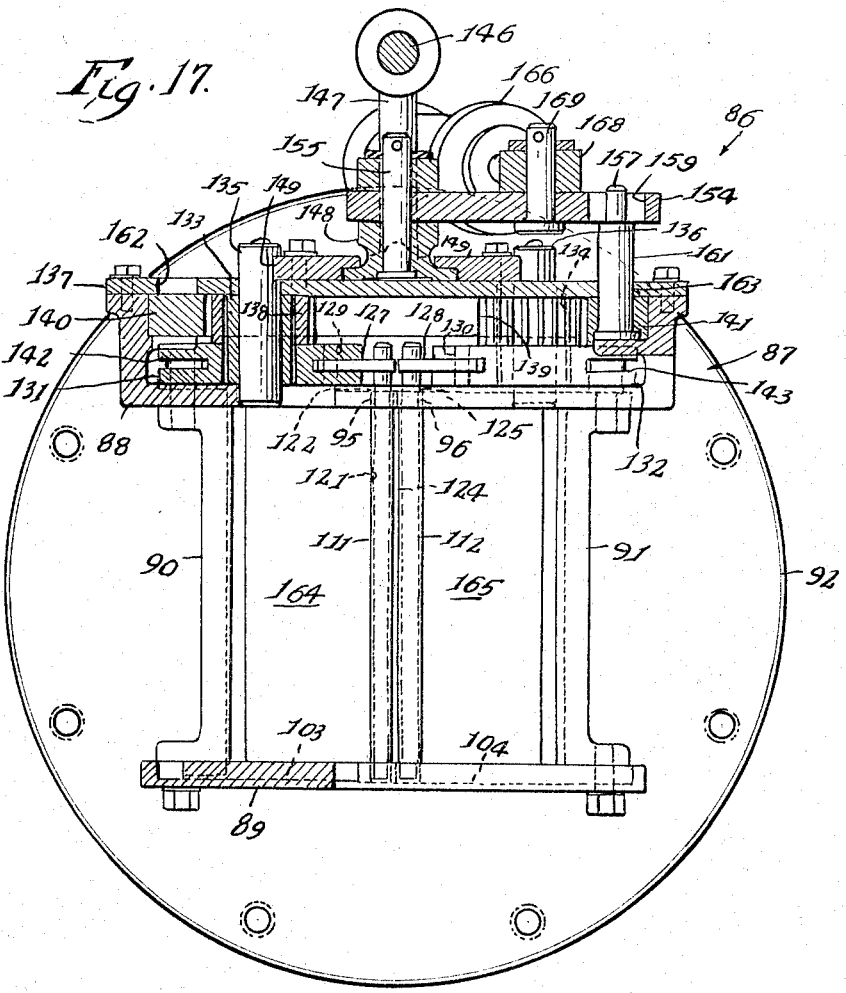

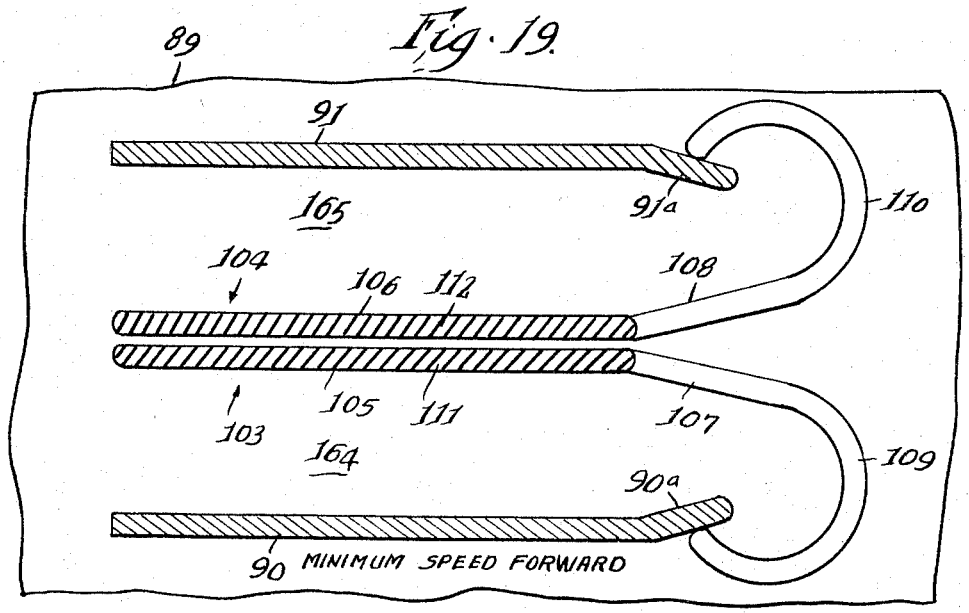
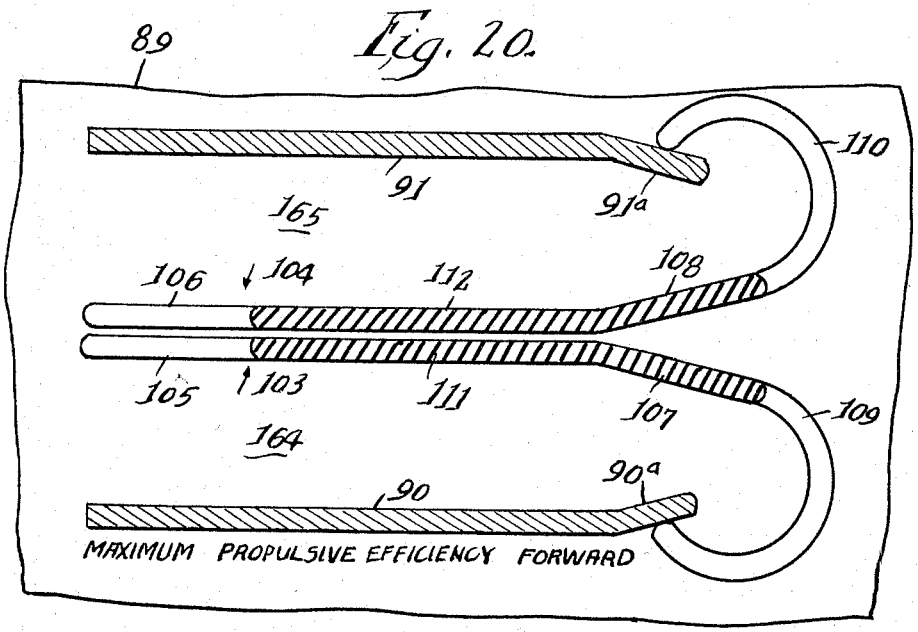

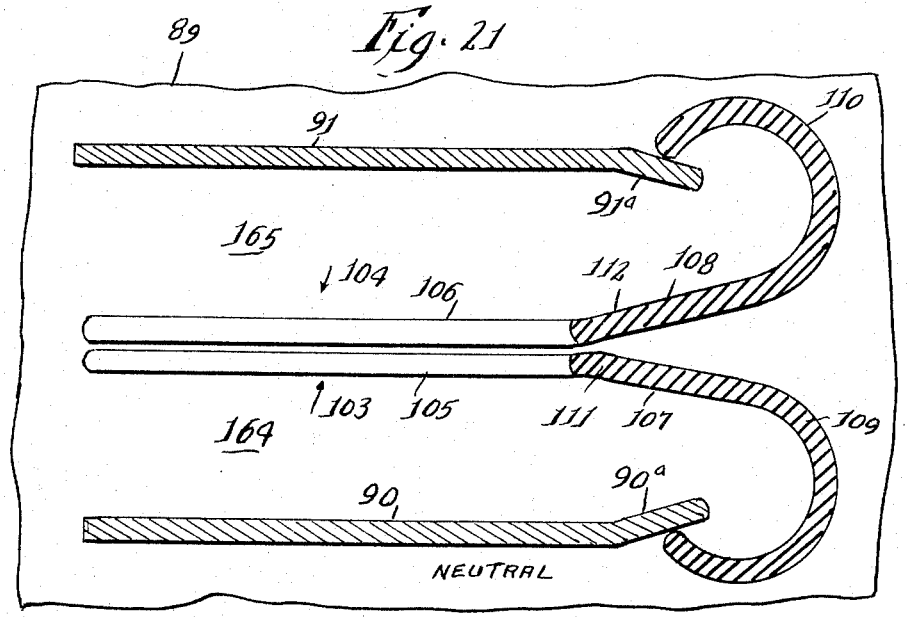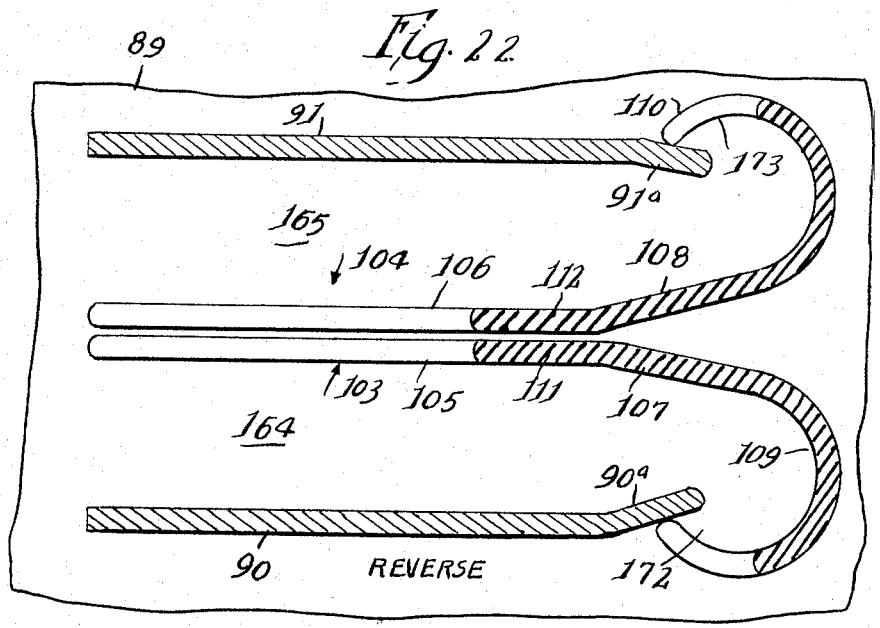

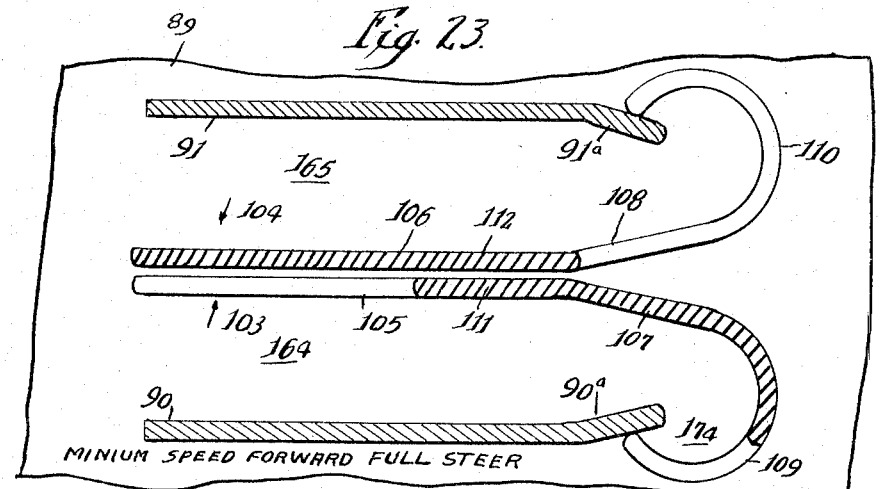
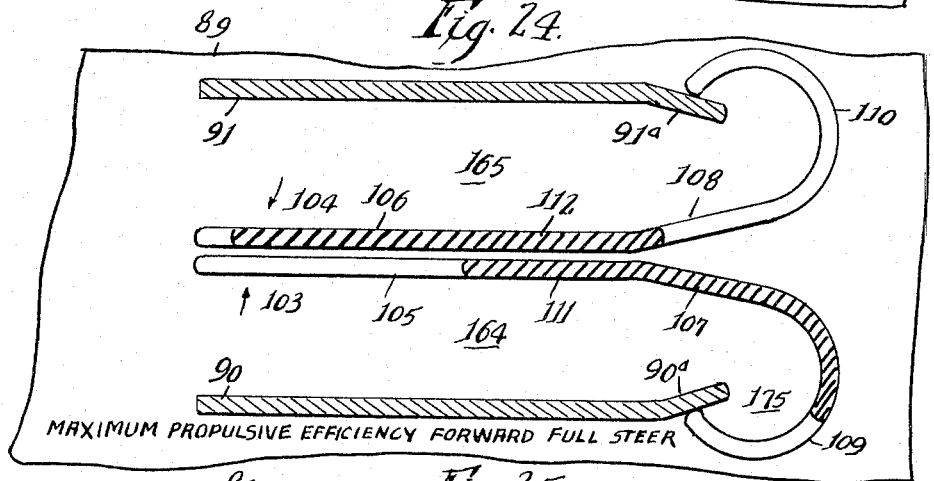
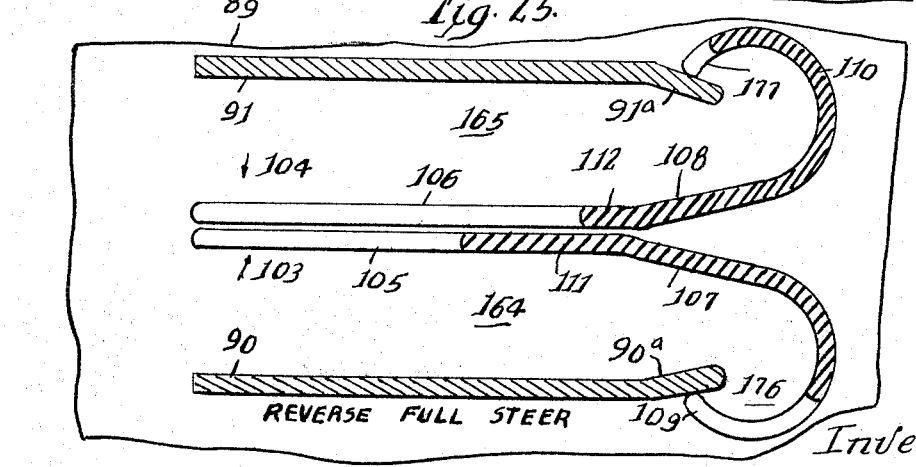

United States Patent Office 3,266,242
Patented August 16, 1966

3,266,242
JET PROPELLED WATER CRAFT
George R. Aschauer, Racine, Wis., assignor to Twin Disc Clutch Company, Racine, Wis., a corporation of Wisconsin
Filed May 17, 1963, Ser. No. 281,104
19 Claims. (Cl. 60—35.54)

My invention relates to jet propelled water craft and is concerned primarily with an arrangement characterized by maximum propulsive efficiency and steering proficiency.

With respect to water craft, propulsive efficiency is defined as the ratio of the power put into the hull and the power put out by the engine. It is known that, generally speaking, maximum propulsive efficiency is obtained when the jet velocity varies directly with hull velocity and specifically is about 1.5 to 2 times the velocity of the hull. Prior structures in this area generally establish one jet velocity for any given engine speed, regardless of variations in loads on the boat and water and weather conditions and are not adapted to maintain maximum propulsive efficiency over an infinite range of hull speeds.

It is therefore one object of the invention to provide a jet propulsion structure for boats having a nozzle incorporating an adjustable orifice arranged to maintain maximum propulsive efficiency in relation to variations in engine speed and hull loads.

A further object is to provide a structure of the character indicated which is adjustable to provide forward and reverse movements of the boat, positive steering during either of these movements and at any speed, and positive steering under a so-called neutral condition when the jet propulsion is interrupted and the boat is moving under its own momentum.

A further object is to provide a marine jet propulsion structure in which at least a portion of the jet stream passage is bounded by doors having a flexing capability combined with unyielding resistance to forces acting transversely of the doors.

FIGS. 6 to 12, inclusive, are sectional, plan, schematic views showing the relation of the doors for respectively determining, minimum and maximum speeds of the boat in forward directions, a neutral jet stream position, straight reverse movements of the craft, and full turns to port at minimum and maximum speeds, and during reverse movement, FIGS. 10 to 12, inclusive, being shown to reduced scale.

Figure 1:
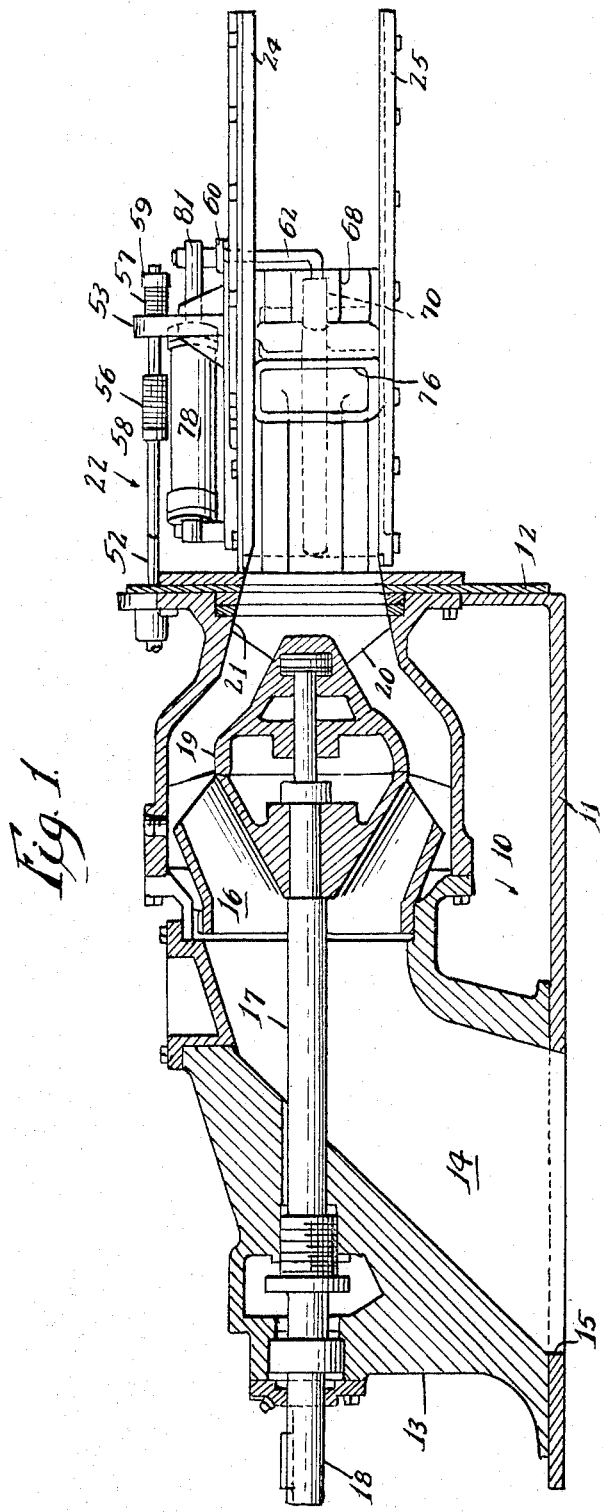
FIG. 1 is a side elevation, partly in section, of one form of the improved structure that includes a nozzle passage having a pair of spaced, flexible doors arranged for movements in the same or opposite directions, the structure being shown in relation to a conventional pumping arrangement for establishing the jet flow.
Figure 14:
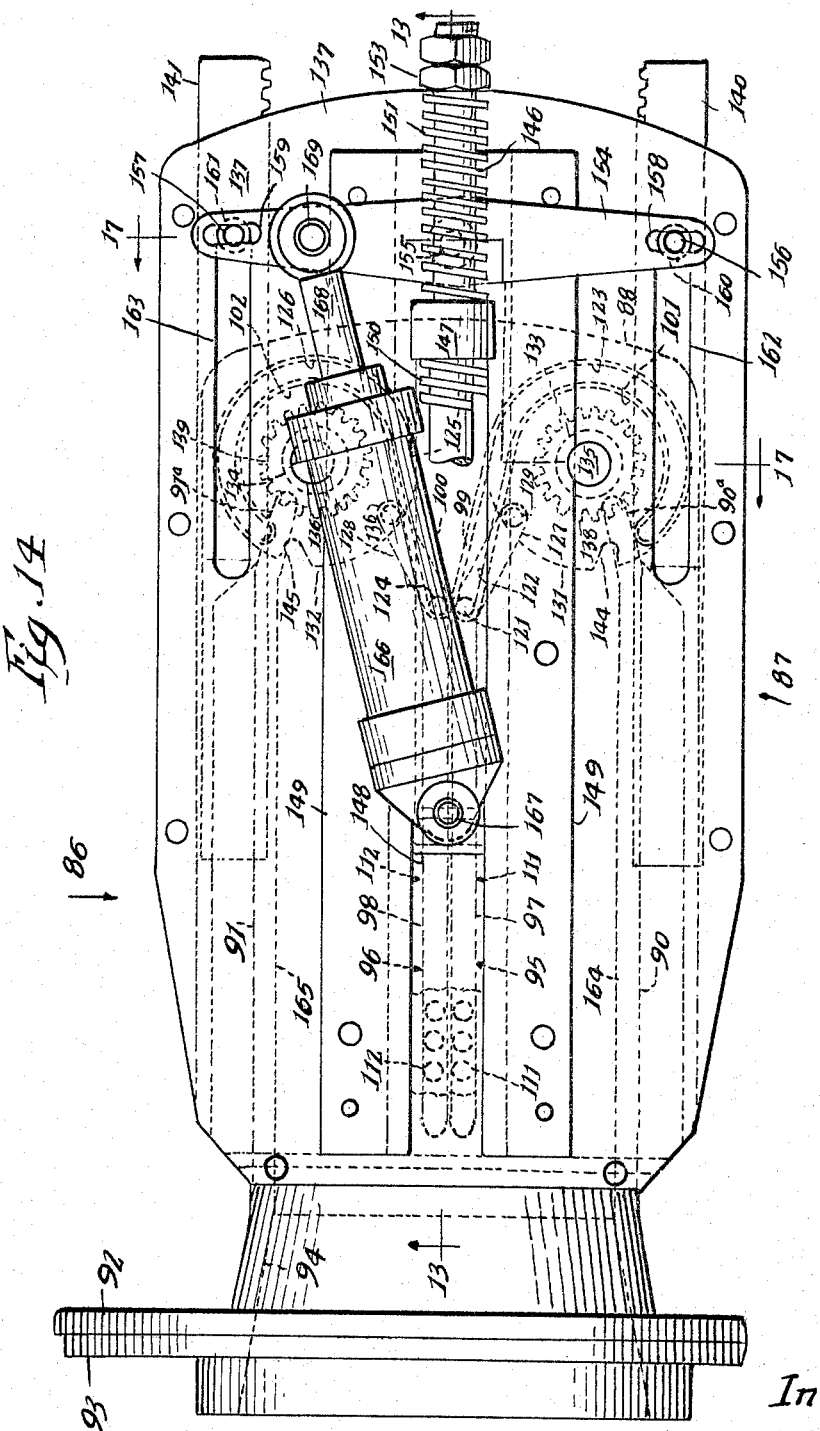

FIG. 13 is a sectional view of a modified jet structure along the line 13—13 in FIG. 14 which differs from that shown in FIG. 1 in that there is a facility for two jet streams separated by adjacent, flexible doors having the noted characteristics.

FIG. 14 is a plan view looking in the direction of the arrow 14 in FIG. 13.

FIG. 15 is a plan section along the line 15—15 in FIG. 13.

FIG. 16 is a section of the upper housing wall only along the line 16—16 in FIG. 15 showing certain groove and slot details.

FIG. 17 is a section along the line 17—17 in FIG. 14.

FIG. 18 is an enlarged, transverse, sectional view of a flexible door for the FIG. 13 structure.

FIGS. 19 to 25, inclusive, are sectional, plan, schematic views showing for the FIG. 13 structure the relation of the flexible doors for respectively determining minimum and maximum speeds of the craft in forward directions, a neutral jet stream position, reverse movements of the craft in straight directions, and full turns to port at minimum and maximum speeds and during reverse movements, FIGS. 23 to 25, inclusive, being shown to reduced scale.

Referring to FIG. 1, the numeral 10 fragmentarily designates a conventional craft having a bottom 11 and a transom 12. Suitably mounted on the bottom 11 adjacent the transom 12 is a pump casing 13 having one end of a water passage 14 communicating with an intake port 15 in the bottom 11 which would be provided with a conventional screen (not shown). The other end of the passage 14 is in water supply communication with a centrifugal pump 16 fast on a shaft 17 that is journaled at one end in the casing 13 and extends therebeyond for driven connection as at 18 with a power source (not shown). The pump 16 is intended to be generally representative of any pumping means for increasing the pressure of the water received from the intake port 15. The other end of the shaft 17 is journaled in a member 19 supported within the casing 13 by spaced stator blades 20 adjacent the outlet of the pump 16. The discharge from the pump 16 is through a converging passage 21 partly included in the casing 13 and partly within a nozzle control device generally designated by the numeral 22 which, as presently described, is operable to selectively control forward, reverse and turning movements of the craft, and also a blocking of the jet discharge. All jet propelled movements of the craft may be accomplished with maximum propulsive efficiency, and the pumping arrangement to the left of the transom 12 in FIG. 1 is generally old.

Figure 2:
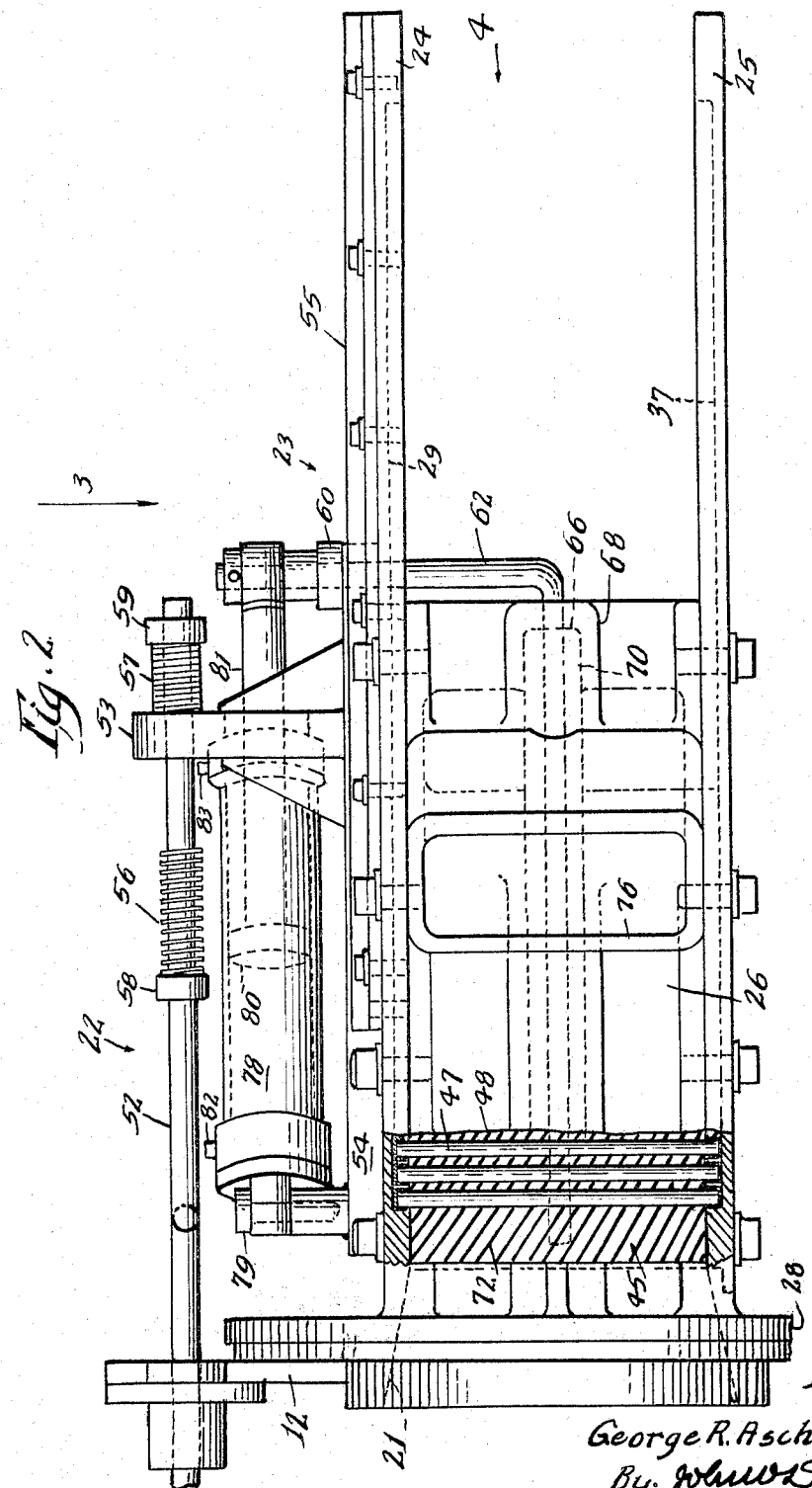
FIG. 2 is an enlarged, side elevation, partly in section, of the control portion of the jet structure as viewed in FIG. 1.
Figure 3:
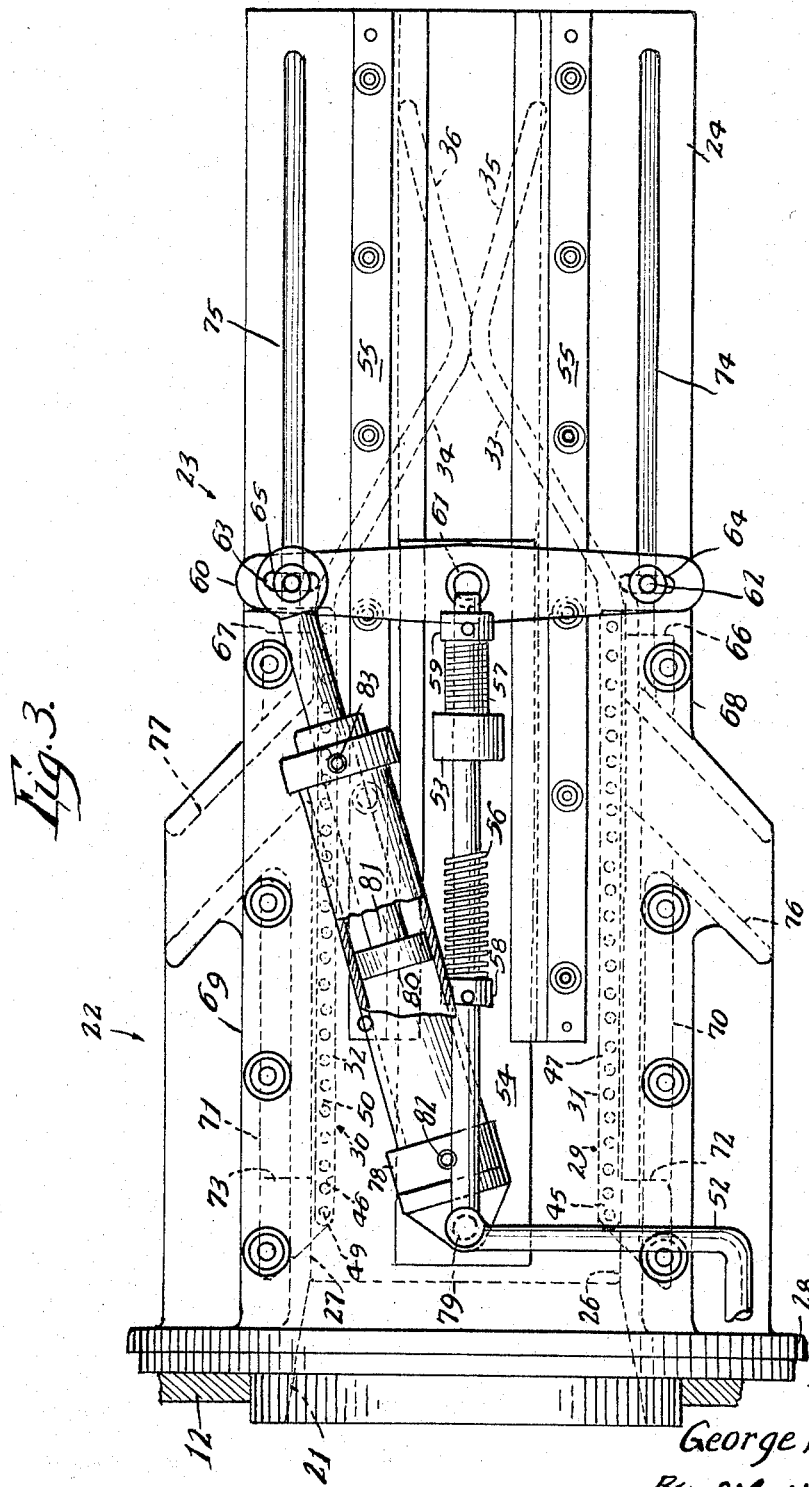
FIG. 3 is a plan view of the structure looking in the direction of the arrow 3 in FIG. 2.

Referring to FIGS. 2 and 3, the nozzle control device 22 includes a housing 23 composed of upper and lower walls 24 and 25 and spaced side walls 26 and 27, all respectively, these walls being suitably tied together and the housing 23 being appropriately fastened through a flange 28 to the transom 12 so that the passage 21 registers with the interior of the housing 23. As shown in FIGS. 2 and 3, the side walls 26 and 27 extend from the flange 28 for a distance somewhat more than one-half of the lengths of the upper and lower walls 24 and 25, respectively, which have the same length, but these relative lengths only apply to the particular arrangement shown and are capable of variation in special situations.

Recessed in the inner face of the upper wall 24 between the side walls 26 and 27 are channel grooves 29 and 30 which, in the FIG. 3 plan view, have the shapes as shown. Specifically, the grooves 29 and 30 include parallel branches 31 and 32 which lie closely adjacent the inner faces of the side walls 26 and 27, branches 33 and 34 arranged in converging relation, and branches 35 and 36 arranged in diverging relation, all respectively, the branches 31, 33 and 35 providing one continuous path and the branches 32, 34 and 36 another continuous path. Further, the junctions of the branches 33 and 35, and the branches 34 and 36 lie closely adjacent for a purpose presently explained.

Similar channel grooves 37 and 38 are recessed in the inner face of the lower wall 25 as more clearly shown in the schematic views, FIGS. 6 to 9, inclusive. The grooves 37 and 38 include parallel branches 39 and 40 which lie closely adjacent the inner faces of the side walls 26 and 27, branches 41 and 42 arranged in converging relation, and branches 43 and 44 arranged in diverging relation, all respectively, the branches 39, 41 and 43 providing one continuous path and the branches 40, 42 and 44 another continuous path. The same consideration respecting the closely adjacent junctions of the branches 41 and 43 and the branches 42 and 44 applies as noted for the corresponding branches in the upper wall 24.

Figure 5:
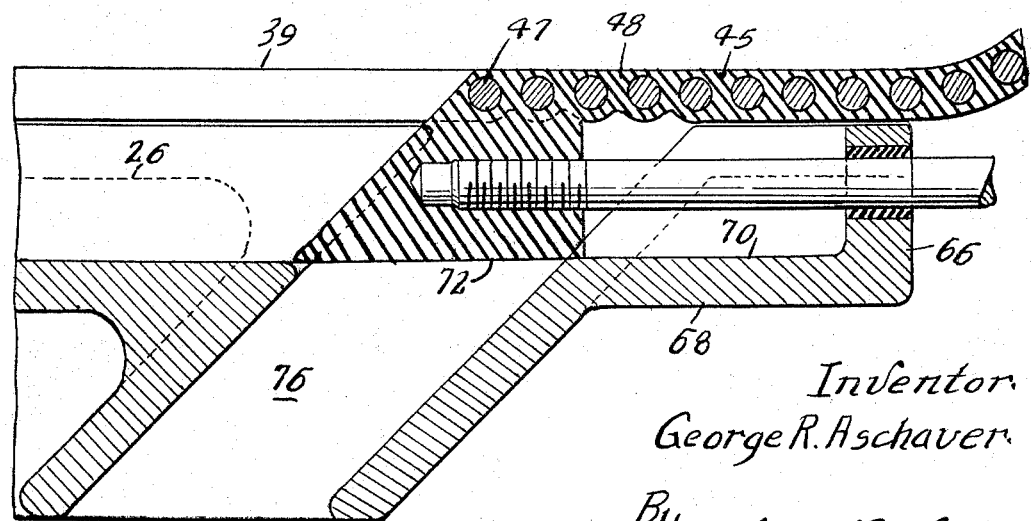
FIG. 5 is an enlarged section of one of the flexible doors taken along the line 5—5 in FIG. 4 and showing the door in one operative position relative to a reverse port.

The respective branches of the upper and lower grooves 29 and 37 are in vertical alignment as are also the respective branches of the upper and lower grooves 30 and 38, all respectively. Vertical, flexible doors 45 and 46 are guide by the grooves 29 and 37, and the grooves 30 and 38, respectively, for movement longitudinally of the control device 22 and comprise the following components, the doors being identical and reference being to FIGS. 2 and 5 which show the door 45. The latter includes a plurality of closely spaced, vertical bars 47 which are reinforcingly embedded in a rubber mass 48 which is conditioned to resist corrosion, erosion and galvanic action and the upper and lower edges of the mass 48 have substantially leak tight contact with the inner surfaces of the upper and lower walls 24 and 25, respectively, while the opposite ends of the bars 47 extend into the upper and lower grooves 29 and 37, respectively, for guidance thereby. The door 46 also includes similar bars 49 embedded in a rubber mass 50 whose upper and lower edges have leak tight contact with the inner surfaces of the upper and lower walls 24 and 25, respectively, and the opposite ends of the bars 49 extend into the upper and lower grooves 30 and 38, respectively, for guidance thereby.

By reason of the foregoing construction, the doors 45 and 46 are sufficiently flexible to freely accommodate movements along the grooves 29 and 37, and 30 and 38, respectively, while maintaining rigidity under the impact of pressures acting transversely of the doors. The doors 45 and 46 and the portions of the upper and lower walls 24 and 25 included therebetween define a nozzle passage 51 having the usual characteristics of reaction propulsion devices.

The doors 45 and 46 are arranged for simultaneous movements in the same direction to selectively determine straight forward and reverse movements of the craft and a neutral condition of the jet stream, and also for relative movements in opposite directions for steering.

Figure 4:
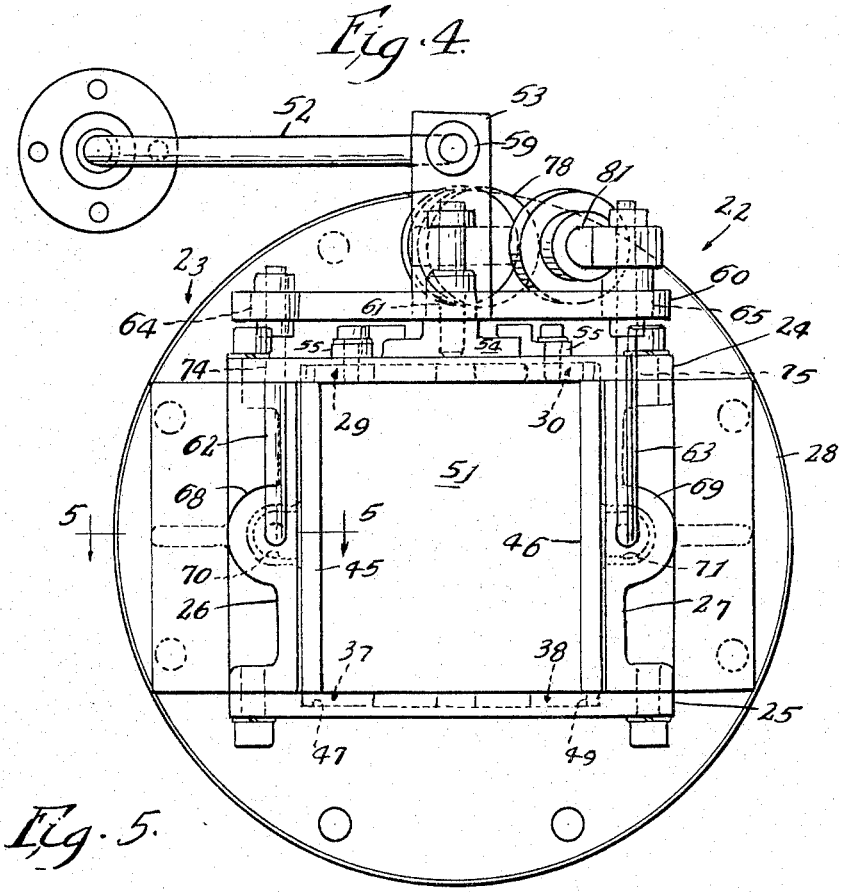
FIG. 4 is an end view looking in the direction of the arrow 4 in FIG. 2.

Referring first to a non-steering condition and considering FIGS. 2, 3 and 4, a forward, reverse and neutral control rod 52, suitably supported at its forward end and controlled from a convenient point in the craft, has its opposite end slidable through a standard 53 which extends upwardly from and is secured to a slide 54 that rests on and extends longitudinally of the housing 23 and preferably midway of the longitudinal edges of the upper wall 24. Guidance for the slide 54 is provided by spaced rails 55—55 secured to the upper wall 24 and yielding engagement of the rod 52 with the standard 53 during the former's reciprocal movements is provided by springs 56 and 57 carried by the rod 52 and respectively interposed between the standard 53 and collars 58 and 59 also mounted on the rod 52.

A steering lever 60 is intermediately pivoted at 61 on the top side of the slide 54 for movement therewith and facility for rotation relative thereto. The opposite ends of the steering lever 60 have pivotal connections with the upper ends of rods 62 and 63 that operate in elongated slots 64 and 65 extending lengthwise of the lever 60. The rods 62 and 63 depend from the lever 60 on opposite sides of the control device 22 for a convenient distance and then extend forwardly considered with respect to the craft, or to the left as viewed in FIGS. 2 and 3, and then through the end walls 66 and 67 of offsets 68 and 69 which project laterally from and extend longitudinally of the side walls 26 and 27 at substantially the mid-portions thereof, all respectively.

The offsets 68 and 69 include longitudinal grooves 70 and 71 within which are reciprocable bosses 72 and 73 projecting outwardly from the doors 45 and 46, all respectively, at the forward ends, thereof, or the left ends as viewed in FIGS. 2, 3 and 6 to 9, inclusive. The rods 62 and 63 are attached to the bosses 72 and 73 and their opposite ends adjacent the connections with the ends of the steering lever 60 extend through longitudinal slots 74 and 75 provided in the upper wall 24. From the foregoing, it will be apparent that fore and aft movements of the slide 54 effected by the control rod 52 will through the rods 62 and 63 cause like and simultantous movements of the flexible doors 45 and 46.

So far as described, the control device 22 is operable to determine forward movements of the craft at selected speeds and in which all of the jet stream is directed rearwardly. For reverse movements, conduits 76 and 77 angle forwardly in diverging relation from the side walls 26 and 27, respectively, and when the doors 45 and 46 are appropriately positioned to prevent rearward discharge of the jet stream, the doors uncover the conduits 76 and 77 to thereby enable the latter to connect the nozzle passage 51 with the atmosphere.

For steering control during forward and reverse, propelled movements of the craft and when the craft is moving under its own momentum, one end of a cylinder 78 is pivoted at 79 on the forward end of the slide 54 and reciprocable in the cylinder 78 is a piston 80 that connects by a rod 81 with the rod 63 at one end of the steering lever 60. A suitable fluid pressure under conventional valving control (not shown) is supplied to the cylinder 78 selectively on opposite sides of the piston 80 through hoses 82 and 83, this cylinder-piston assembly being of the well known double acting type.

The fore and aft position of the cylinder 78 is always determined by the location of the slide 54, but it will be apparent that, for steering purposes as hereinafter described, the steering lever 60 may be rocked in either direction dependent upon the fluid pressure selection to the cylinder 78 to effect relative shifts of the flexible doors 45 and 46. Since the door 45 is at the limit of its forward movement, a clockwise rock of the steering lever 60 effects a rearward movement of the door 46 by reason of movement of the slide 54 rearward and the instantaneous pivoting of the lever 60 on the rod 62.

For a more detailed explanation of the operation of the control device 22, reference is made to the schematic arrangements shown in FIGS. 6 to 12, inclusive. In these figures, only the lower wall 25 with its channel grooves 37 and 38 are shown along with the side walls 26 and 27 and the outlines of the flexible doors 45 and 46, the reinforcing bars 47 being omitted. It will be understood that the following position descriptions of the flexible doors 45 and 46 relative to the lower channel grooves 37 and 38 are also applicable to the cooperating, upper channel grooves 29 and 30, all respectively.

Referring to FIG. 6, the flexible doors 45 and 46 occupy their furthest forward positions in which they mask the reverse conduits 76 and 77 and the rear ends of the doors are adjacent the rear ends of the side walls 26 and 27. These door positions generally determine the low or minimum, forward speed of the craft in accordance with the known propulsive reaction principle characteristic of such a structure. The door positions shown in FIG. 6 are identical with those shown in FIGS. 2, 3 and 4 and hence the steering control is as shown in FIG. 3 with the steering lever 60 normal to the longitudinal center line of the housing 23 and the slide 54 occupying its furthest left or forward position.

To secure maximum, forward speed of the craft, the control rod 52 is moved rearwardly or to the right until the doors 45 and 46 generally occupy the positions shown in FIG. 7 with the doors occupying parts of the groove branches 41 and 42, respectively, and wherein the discharge area of the nozzle passage 51 is decreased relative to that shown in FIG. 6. In FIG. 7, the doors 45 and 46 also mask the reverse conduits 76 and 77, respectively, and there is no change over FIG. 6 in the position of the steering lever 60. For maximum propulsive efficiency, the discharge ends of the doors 45 and 46 are adjustable to vary the jet flow to maintain the desired relation between jet and hull velocities as loads on the craft vary and to meet slowing factors such as wind, tide and rough water. This door adjustment may be determined by feel of the craft or by observing an appropriate instrument on the craft.

When the doors 45 and 46 are moved to the positions shown in FIG. 8, rearward flow of the jet stream is completely blocked, as are also the reverse conduits 76 and 77. This may be termed the neutral position and the available reaction pressure may be employed to clear the intake port 15 of any accumulated debris and it is also possible to attach a hose connection (not shown) to the passage 21 for deck cleaning and fire fighting.

For straight astern movement, the doors 45 and 46 are moved to their extreme right or fully aft positions as shown in FIG. 9. The rearward flow of the jet stream is then completely blocked, but the reverse conduits 76 and 77 are fully open and communicate with the nozzle passage 51. The rearward thrust against the doors 45 and 46 is translated into generally forwardly directed jet streams operating through the reverse conduits 76 and 77 and to thereby establish an astern movement of the craft in a straight direction. Maximum propulsive efficiency during straight astern movements can be maintained by varying the extent to which the conduits 76 and 77 are opened.

Steering of the craft is generally effected by establishing desired fore and aft relations of the flexible doors 45 and 46, one door being further forward than the other door depending upon which direction the craft is to turn. For illustrative purpose, three full turns to port under conditions of minimum and maximum, forward speeds of the craft and reverse movements thereof are respectively shown in FIGS. 10, 11 and 12.

Referring to FIG. 10 and considering the final and relative positions of the doors 45 and 46 as shown, the flexible door 45 occupies its furthest forward position while the door 46 has been moved aft until a determined portion thereof, now designated by the numeral 84, occupies a part of the branch groove 42. In these positions, the doors 45 and 46 mask the reverse conduits 76 and 77 and it will be apparent that the jet stream moving between the rear ends of the doors 45 and 46 will exert a thrust against the door portion 84 and effect a turn of the craft to port.

To place the doors 45 and 46 in the turn positions shown in FIG. 10 and assuming that they were moved thereto from the forward, minimum speed positions shown in FIG. 6, the steering lever 60 is rocked clockwise, as viewed in FIG. 3, but with instantaneous pivoting on the rod 62 and rearward movement of the slide 54 so that the door 45 remains in the position shown in FIGS. 6 and 10 and the door 46 will be moved rearwardly to the position shown in FIG. 10.

With the doors 45 and 46 in the forward, maximum speed positions shown in FIG. 7, a full turn to port can be executed by rocking the steering lever 60 clockwise, as viewed in FIG. 3, to move the doors 45 and 46 to the relative positions shown in FIG. 11, the doors 45 and 46 being moved forwardly and rearwardly, respectively, from their positions as shown in FIG. 7. In the FIG. 11 situation, the doors 45 and 46 mask the reverse conduits 76 and 77, respectively. Compared to FIG. 10, a greater length of the door 46 now occupies the branch groove 42 and this door portion is designated by the numeral 85. Accordingly, the jet stream discharging rearwardly between the doors 45 and 46 exerts a thrust on the door portion 85 which effects a turn of the craft to port.

When the craft is proceeding astern in a straight direction with the doors 45 and 46 in the relative positions shown in FIG. 9 and the reverse conduits 76 and 77 fully open, a full turn to port can be effected by placing the doors 45 and 46 in the relative positions shown in FIG. 12. Rearward discharge of the jet stream remains blocked, the door 46 masks the conduit 77 and the conduit 76 is fully open. Hence, the reactive thrust of the jet stream acting through the conduit 76 effects the indicated turn. To move the doors 45 and 46 from the relative positions in FIG. 9 to those shown in FIG. 12, the steering lever 60 is rocked counterclockwise, as viewed in FIG. 3, with instaneous pivoting on the rod 62 and forward movement of the slide 54. The door 45 will remain stationary and the door 46 will move to the FIG. 12 position.

When the craft is moving under its own momentum, as distinguished from jet propelled movement, the doors 45 and 46 occupy the relative positions shown in FIG. 8 and a full turn to port can be effected by a counterclockwise rock of the steering lever 60, as viewed in FIG. 3, to thereby place the doors 45 and 46 in the relative positions shown in FIG. 12.

Less than full turns to port in the minimum and maximum speed conditionings of the control device 22 are accomplished by varying the extent to which the door 46 extends into the branch groove 42, i.e., by varying the lengths of the door portions 84 and 85, respectively. For reverse, less than full turns to port are effected by varying the extent to which the door 45 uncovers the reverse conduit 76. It will be apparent that turns to starboard will be made by contrary rocks of the steering lever 60 and less than full turns to starboard under the same conditions are accomplished in an obvious manner.

FIGS. 13 to 25, inclusive, show a variant form of control device, generally designated by the numeral 86, which employs two jet streams separated by adjacent, fore and aft, movable and flexible doors whose relative positions determine minimum and maximum speeds and reverse movements of the craft, a neutral jet stream position, and turns to port and starboard.

Referring to FIGS. 13 and 14, the control device 86 includes a housing 87 composed of upper and lower walls 88 and 89 and spaced side walls 90 and 91, all respectively, these walls being appropriately connected and the housing 87 being suitably attached through a flange 92 to the transom 93. The housing 87 includes a converging passage 94 which connects the interior of the housing with a pumping, water supply arrangement (not shown), but understood to be functionally similar to that shown in FIG. 1. As shown, the side walls 90 and 91 extend from the delivery end of the passage 94 for a distance more than one-half of the lengths of the upper and lower walls 88 and 89, respectively, which have the same length, but these relative lengths are subject to variation depending upon the requirements involved.

Channel grooves 95 and 96 are recessed in the inner face of the upper wall 88 and are shaped as shown in FIGS. 14 and 15. Specifically, the grooves 95 and 96 include straight branches 97 and 98 which are parallel to each other and to the side walls 90 and 91 and are positioned close to and on opposite sides, respectively, of an imaginary, longitudinal, median line between the latter walls. The left ends of the branches 97 and 98, as viewed in FIG. 14, begin close to the discharge end of the passage 94 and the opposite ends connect through diverging branches 99 and 100 with parti-circular branches 101 and 102 which curve laterally in opposite directions and forwardly of the control device 86, all respectively, the branches 97, 99 and 101 providing one continuous path and the branches 98, 100 and 102 another continuous path.

Similar channel grooves 103 and 104 are provided in the inner face of the lower wall 89 as more clearly shown in the schematic views, FIGS. 19 to 25, inclusive. The grooves 103 and 104 include parallel branches 105 and 106 positioned in the same relation to each other and to the side walls 90 and 91 as noted for the upper branches 97 and 98, diverging branches 107 and 108, and parti-circular branches 109 and 110 which curve laterally in opposite directions and then forwardly, all respectively, the branches 105, 107 and 109 providing one continuous path and the branches 106, 108 and 110 another continuous path. Preferably, the aft ends of the side walls 90 and 91 bend inwardly or in converging relation as at 90a and 91a and extend beyond the aft ends of the parallel upper branch grooves 97 and 98 and the comparable lower branch grooves 105 and 106.

The respective branches of the upper and lower grooves 95 and 103 are in vertical alignment as are also the respective branches of the upper and lower grooves 96 and 104, all respectively. Vertical, flexible doors 111 and 112 are guided by the grooves 95 and 103, and the grooves 96 and 104, all respectively, for movements as hereinafter described that control forward and astern motion of the craft as well as steering under all conditions including that when the craft is proceeding under its own momentum. For drawing convenience and in the interest of clarity, it will be understood that, in FIG. 14, the upper channel grooves 95 and 96 are shown along with a fragmentary showing of the associated doors 111 and 112, and that in FIG. 15, these doors are shown schematically.

The doors 111 and 112 are identical in a general sense and reference is made to FIGS. 13 and 18 which show the door 111. The latter includes a plurality of closely spaced, vertical bars 113 which are embedded in a rubber mass 114 as reinforcement and this mass may be faced on that side which opposes the side wall 90 by a suitable square woven fabric 115, such as nylon. On the opposite side of the door 111, the rubber mass 114 conforms generally to the shape of the bars 113 and to thereby provide between each adjacent pair of bars a reduced rubber neck 116 to facilitate flexing of the door 111. The left or forward end of the door 111 includes a wing 117 that may be tapered for water guidance. To the extent necessary to describe the door 112, it includes spaced vertical bars 118 (see FIG. 15) embedded in a rubber mass 119 and a guidance wing 120 at its left or forward end.

The doors 111 and 112 are conditioned to resist corrosion, erosion and galvanic action and the upper and lower edges of the rubber masses 114 and 119 have substantially leak tight contact with the inner faces of the upper and lower walls 88 and 89, respectively, while the opposite ends of the bars 113 and 118 are enlarged and extend into the upper and lower grooves 95 and 104, and into the upper and lower grooves 96 and 104, all respectively, for guidance thereby as representingly shown by the bars 118 in FIG. 13. The bar at the right or aft end of the door 111, designated by the numeral 121 and also embedded in the rubber mass 114, is longer than the bars 113 for a purpose hereinafter set forth and its lowered end is guided by the lower groove 103. The upper end of the bar 121 extends through a slot 122 in the upper wall 88 which connects with a parti-circular slot 123 that is concentric with the parti-circular groove 101 (see FIGS. 14 and 15). A long bar 124, similar to the bar 121, is embedded in the rubber mass 119 at the right or aft end of the door 112, the bar 124 being longer than the bars 118 and having its lower end guided by the lower groove 104. The upper end of the bar 124 extends through a slot 125 in the upper wall 88 which connects with a parti-circular slot 126 that is concentric with the parti-circular groove 102 (see FIGS. 13, 14 and 15).

As shown in the latter figures and in FIG. 16, the slots 122, 123, 125 and 126 register and communicate with the grooves 99, 101, 100 and 102, respectively, the indicated slots each having a width less than the width of the associated groove which provide guides for the enlarged ends of the bars 113 and 118.

The upper projecting ends of the long bars 121 and 124 are pivotally connected to flat links 127 and 128 and the opposite ends of these links have pivotal connections with pins 129 and 130 carried by horizontal disks 131 and 132 that have splined connections with sleeves 133 and 134 journaled on pins 135 and 136, all respectively, and the opposite ends of the latter pins are respectively mounted in the upper wall 88 and a cover plate 137 that overlies and is spaced from the wall 88 (see FIGS. 13 and 17). Disposed above the disks 131 and 132 are gears 138 and 139 which constantly mesh with gear racks 140 and 141, respectively, that extend longitudinally of the control device 86 and are supported by and slidable between the upper wall 88 and the cover plate 137.

From the foregoing, it will be apparent that, when the racks 140 and 141 are moved forward or to the left as viewed in FIG. 15, the doors 111 and 112 are simultaneously moved aft or to the right and that, when the doors 111 and 112 are in some positions to the right of those shown in FIG. 15, aft movements of the racks 140 and 141 will move the doors 111 and 112 forwardly. To accommodate the links 127 and 128 during the rotative movements of the disks 131 and 132, the latter are provided intermediate their opposite surfaces with annular channels 142 and 143 (see FIG. 17) and the peripheries of the disks 131 and 132 are provided with notches 144 and 145 for receiving the upper ends of the bars 121 and 124, all respectively.

The mechanism for simultaneously shifting the doors 111 and 112 fore and aft to effect straight forward and reverse movements of the craft, and to relatively shift the doors forward and aft, respectively, for steering will now be described, reference being to FIGS. 13, 14 and 17.

A forward, reverse and neutral control rod 146, suitably supported at its forward end and controlled from a convenient point in the craft, has its opposite end shiftable through a standard 147 which extends upwardly from and is secured to a slide 148 which extends longitudinally of the housing 87 and preferably midway of the longitudinal edges of the cover plate 137. Guidance for the slide 148 is provided by spaced rails 149—149 secured to the cover plate 137 and yielding engagement of the rod 146 with the standard 147 is provided by springs 150 and 151 carried by the rod 146 and respectively interposed between the standard 147 and collars 152 and 153 also mounted on the rod 146.

A steering lever 154 is intermediately pivoted at 155 on the slide 148 aft of the standard 147 for movement therewith and capacity for rotation relative thereto. The opposite ends of the lever 154 have pivotal connections with the upper ends of pins 156 and 157 that operate in elongated slots 158 and 159 extending lengthwise of the lever 154 and the lower ends of the pins 156 and 157 160 and 161 and anchored in the racks 140 and 141, the enlarged pin portions 160 and 161 being operable along slots 162 and 163 in the cover plate 137, all respectively (see FIGS. 14 and 17). It will be apparent therefore that, with the slide 148 and hence the lever 154 in the positions shown in FIGS. 14 and 17, a forward movement of the slide 148 will occasion simultaneous aft movements of the door 111 and 112 and that, if the slide 148 is displaced to some position forward of that shown in FIG. 14, an aft movement of the slide 148 will simultaneously shift the doors 111 and 112 forward.

So far as described, the control device 86 is operable to determine forward and reverse movements of the craft at selected speeds. Specifically, the control device 86 includes two nozzle passages 164 and 165 respectively defined by the upper and lower walls 88 and 89, the side wall 90 and the door 111, and by the upper and lower walls 88 and 89, the side wall 91 and the door 112. As described in detail hereinafter, the positions of the doors 111 and 112 in relation to the side walls 90 and 91 may be such as to provide for rearward direction of the jet streams and forward movement of the craft at selected speeds, and in other positions to shunt the jet streams in generally forward directions to effect reverse motion of the craft.

For steering control during forward and reverse, propelled movements of the craft and when the craft is moving under its own momentum, one end of a conventional, double acting piston assembly, generally designated by the numeral 166 and similar to the comparable assembly shown in FIG. 3, is pivoted at 167 on the forward end of the slide 148 and its piston rod 168 connects pivotally by means of a pin 169 with a convenient part of the steering lever 154 between the pivot 155 thereof and the pin 157. Movements of the piston rod 168 in either direction with corresponding rocking of the steering lever 154 are effected by the supply of pressure fluid through the hoses 170 and 171 shown only in FIG. 13 and under conventional valving control (not shown).

The fore and aft positions of the piston assembly 166 is always determined by the location of the slide 148, but it will be understood that, for steering purposes as hereinafter described, the steering lever 154 may be rocked in either direction to effect relative shifts of the doors 111 and 112. For example, considering as viewed in FIG. 14 and since the door 112 is at the limit of its forward movement, a clockwise rock of the steering lever 154 moves the rack 140 forward and the door 111 aft, but the rack 141 and the door 112 remain stationary. During this action, the steering lever 154 instantaneously pivots on the pin 157 and the slide 148 moves forward.

The actions of the doors 111 and 112 in determining forward movements of the craft at selected speeds, reverse movements and steering are shown schematically in FIGS. 19 to 25, inclusive, to which reference will now be made. In these figures, only the lower wall 89 with its channel grooves 103 and 104 are shown along with the side walls 90 and 91 and the outlines of the flexible doors 111 and 112, the reinforcing bars 113, 118, 121 and 124 being omitted. Additionally, it will be understood that the positions assumed by the doors 111 and 112 relative to the lower channel grooves 103 and 104 are also in relation to the cooperating upper, channel grooves 96 and 98, all respectively.

Referring to FIG. 19, the flexible doors 111 and 112 occupy their furthest forward positions in which the distances of the rear edges of the doors 111 and 112 from the like edges of the side walls 90 and 91, respectively, are the maximum. In these door positions, the jet streams moving through the nozzle passages 164 and 165 are discharged rearwardly and generally determine the low or minimum, forward speed of the craft in accordance with the known principle of propulsive reaction. The door positions shown in FIG. 19 are identical with those shown in FIGS. 13, 14 and 15 so that the slide 148 and steering lever 154 occupy the positions shown in FIG. 14.

For maximum, forward speed of the craft, the control rod 146 is moved forwardly or to the left, thus shifting the racks 140 and 141 in the same direction and causing the disks 131 and 132 to simultaneously drag the doors 111 and 112 aft to the positions generally shown in FIG. 20. Parts of the doors 111 and 112 then occupy the branch grooves 107 and 108 and the discharge areas of the nozzle passages 164 and 165, all respectively, are decreased over those shown in FIG. 19, but the jet streams are still discharged rearwardly for forward propulsion. For maximum propulsive efficiency, the comments expressed above in relation to FIG. 7 are also applicable to FIG. 20.

For the neutral positions as defined for FIG. 8 and which embody all of the characteristics of the latter figure, the doors 111 and 112 are shifted to the positions shown in FIG. 21 and in which the leading edges of the doors 111 and 112, considered with respect to their direction of movement, contact the bent side wall portions 90ª and 91ª, respectively. Accordingly, all jet stream flow through the nozzle passages 164 and 165 is blocked and the water backs through the intake port 15 (see FIG. 1).

To accomplish straight astern movement, the doors 111 and 112 are moved to the positions generally shown in FIG. 22 wherein parts of the doors 111 and 112 occupy parts of the branch grooves 109 and 110, and 105 and 106, and all of the branch grooves 107 and 108, all respectively. The aft edges of the doors 111 and 112 are then spaced from the side wall portions 90ª and 91ª to provide discharge orifices 172 and 173 and the relations of these orifices to the side wall portions 90ª and 91ª and the doors 111 and 112, all respectively, are such that the jet streams are directed forwardly of the craft and in diverging relation. The craft then moves straight astern and maximum propulsive efficiency is determinable by adjusting the areas of the orifices 172 and 173.

Steering of the craft is accomplished by establishing desired fore and aft positions of the doors 111 and 112 in relation to the side wall portions 90ª and 91ª, one door being further forward than the other door depending upon the steering direction desired. By way of example, three full turns to port during minimum and maximum, forward speeds of the craft and reverse movements are shown in FIGS. 23, 24 and 25, respectively.

Referring to FIG. 23 and considering the final and relative positions of the doors 111 and 112 as shown, the door 112 occupies its furthest forward position, as also shown in FIGS. 13, 14 and 15, while the door 111 is moved aft until a determined portion thereof occupies a part of the branch groove 109 and such that the aft edge of the door 111 defines with the adjacent part of the side wall portion 90 an orifice 174 that faces laterally from the nozzle passage 164. With the doors 111 and 112 in the indicated relative positions, the jet stream moving through the nozzle passage 165 discharges rearwardly to maintain forward motion of the craft while the jet stream moving through the nozzle passage 164 discharges laterally of the craft through the orifice 174 and effects by its reaction on the door 111, a turn of the craft to port.

To place the doors 111 and 112 in the turn positions shown in FIG. 23 and assuming that they were moved thereto from the forward, minimum speed positions shown in FIGS. 13, 14, 15 and 19, the steering lever 154 is rocked clockwise, as viewed in FIG. 14, but with instantaneous pivoting on the pin 157 and forward movement of the slide 148. The door 112 remains in the position shown in FIGS. 13, 15 and 23 while the door 111 will be moved rearwardly to the position shown in FIG. 23.

With the doors 111 and 112 in the forward, maximum speed positions shown in FIG. 20, a port turn is executed by rocking the steering lever 154 clockwise, as viewed in FIG. 14, to move the doors 111 and 112 to the relative positions shown in FIG. 24. In the latter positions and relative to those shown in FIG. 20, the door 111 is further aft and the door 112 is further forward. The door 112 occupies a part of the branch groove 108 and the aft edge of the door 111 defines with the side wall portion 90ª a discharge orifice 175 whose position and function in relation to the jet stream moving through the nozzle passage 164 is generally similar to the orifice 174. The jet stream proceeding through the nozzle passage 165 is discharged rearwardly as in FIG. 23 and for the same purpose.

When the craft is being propelled astern in a straight direction and with the doors 111 and 112 in the relative positions shown in FIG. 22, a full turn to port is executed by rocking the steering lever 154 counterclockwise, as viewed in FIG. 14, to place the doors 111 and 112 in the relative positions shown in FIG. 25. The doors 111 and 112 then define with the bent wall portions 90ª and 91ª a discharge orifice 176 and a discharge orifice 177, respectively, the former being larger than the latter and the reactive thrust of the jet stream proceeding through the orifice 176 turns the craft to port since this stream is projected laterally. Generally speaking the jet stream discharged through the port 177 is in a forwardly direction.

When the craft is moving under its own momentum, the doors 111 and 112 occupy the positions shown in FIG. 21 and a full turn to port can be effected in the same manner as indicated for reverse steering in FIG. 25.

For forward and reverse turns to port less than full, the relative fore and aft positions of the doors 111 and 112 may be adjusted accordingly to vary the discharge orifices as will be obvious. Starboard turns are effected by rocks of the steering lever 154 contrary in each instance to those noted above.

The generic aspect of the two modifications outlined above involve the use of flexible walls constituting at least one boundary of the nozzle passage through which the jet stream moves, flexibility relating to the plane of the wall which is still rigid against forces acting transversely of the wall. This characteristic enables the walls to be freely moved along irregular paths and into selected positions determining various speeds of the craft forward and astern, as well as steering in either direction. Further, all parts of the control structure are above water which eliminates any drag during craft movement and any problem as to draft. In FIGS. 3 and 6 to 12, inclusive, while parts of the X-related portions of the channel grooves 29 and 30, and 37 and 38, respectively, are shown as contiguous, sufficient clearance would be provided between such parts to insure free running clearance for the doors 45 and 46.

I claim:

1. In jet propelled water craft having nozzle passage means and pumping means for discharging water through the nozzle means as a reaction propulsive jet, control means for regulating the jet flow comprising a housing carried by the craft and above the water line and through which the nozzle passage means extends, said housing including upper and lower flat surfaces which partially define said passage means, the passage means also being partly defined by unitary slidable door means which includes a vertical, flexible door having a flexing capability relative to the plane thereof throughout its length and rigidity against pressures acting transversely thereof, means for mounting said door on said surfaces and in said passage means for shifting and flexing to vary the cross sectional area of said passage means, and means for positioning the door means to vary the ratio of jet to craft speed.

2. A structure as defined in claim 1 wherein the nozzle passage means is constituted by a single nozzle passage and the door means comprises a pair of doors arranged in facing relation and slidably guided by the housing for movement forward and aft of the nozzle passage, each door having a flexing capability relative to the plane of the door and rigidity against pressures acting transversely thereof, the aft ends of the doors partly defining a discharge orifice for the nozzle passage, and means for positioning the doors independently of one another to vary the area of the orifice.

3. A structure as defined in claim 2 wherein the slidable guidance for the doors comprises grooves having parallel branches connecting adjacent the aft end of the nozzle passage with convergingly related branches, respectively, and means for simultaneously positioning the doors between positions in which the doors are substantially entirely located in the parallel branches, and positions in which equal parts of the doors are located in the converging branches, respectively, to thereby vary the area of the discharge orifice during a forward movement of the craft.

4. A structure as defined in claim 2 wherein the slidable guidance for the doors comprises grooves having parallel branches connecting adjacent the aft end of the nozzle passage with convergingly related branches, respectively, and means for moving the doors in relative opposite directions to positions defining a rearwardly discharging orifice in which unequal parts of the doors are located in the converging branches, respectively, whereby a greater thrust is exerted against the larger door part to effect steering and forward movement of the boat.

5. A structure as defined in claim 2 wherein the housing includes on opposite sides thereof reverse conduits extending forwardly of the craft in diverging relation and communicable with the nozzle passage, and means for positioning the doors between positions in which the conduits are masked by the doors and the area of the discharge orifice is varied to determine selected forward speeds of the craft, and positions in which the nozzle passage is blocked by the doors and the conduits are unmasked to connect with the nozzle passage to determine astern movement of the craft.

6. A structure as defined in claim 5 wherein the slidable guidance for the doors comprises grooves having parallel branches connecting adjacent the aft end of the nozzle passage with convergingly related branches which connect with divergingly related branches, respectively, the converging and diverging branches being substantially X-related, and wherein when the reverse conduits are unmasked, the doors substantially occupy all of the converging and diverging branches.

7. A structure as defined in claim 6 wherein means is additionally provided, when the doors are in positions determining said astern movement of the craft, for moving the doors in opposite directions to mask one reverse conduit and unmask the other reverse conduit to thereby steer the craft while proceeding astern.

8. A structure as defined in claim 1 wherein the door means comprises a water resistant mass, a plurality of closely spaced bars embedded in and reinforcing the mass against transverse pressure, the opposite ends of the bars extending beyond the adjacent edges of the door, respectively, and the nozzle passage means being partly defined by walls forming a part of the housing and which include grooves for receiving the bar ends to guide the sliding movement thereof.

9. A structure as defined in claim 2 wherein the positioning means for the doors comprises a fore and aft movable slide carried by the housing, and connections between the slide and the doors, respectively.

10. A structure as defined in claim 4 wherein the means for moving the doors in opposite directions comprises a fore and aft, movable slide carried by the housing, an intermediately pivoted lever mounted on the slide, and connections between the lever and the doors, respectively.

11. A structure as defined in claim 1 wherein the nozzle passage means is constituted by twin nozzle passages extending longitudinally of the housing, each of the twin passages being partly defined by a housing side wall and a door arranged in facing relation thereto and slidably guided by the housing for movement fore and aft of the associated nozzle passage to vary the discharge orifice thereof, each door having a flexing capability relative to the plane thereof and rigidity against transverse pressures and the doors being disposed on opposite sides of the longitudinal median line of the housing, the aft end of each door partly defining with the adjacent side wall a discharge orifice for the associated passage, and means for positioning the doors to vary the areas of the respective orifices.

12. A structure as defined in claim 11 wherein the slidable guidance for the doors comprises grooves having branches parallel to each other and to the side walls and disposed on opposite sides of and closely adjacent the longitudinal median line of the housing, divergingly related branches connecting the parallel branches, respectively, adjacent the aft ends of the nozzle passages, and means for simultaneously positioning the doors between positions in which the doors are substantially entirely located in the parallel branches, and positions in which equal parts of the doors are located in the diverging branches, respectively, to thereby vary the areas of the discharge orifices during a forward movement of the craft.

13. A structure as defined in claim 11 wherein the slidable guidance is additionally provided by laterally spaced, parti-circular branches connecting at one end with the diverging branches and curving forward of the housing to terminate adjacent the side walls, all respectively, and means for moving the doors in relative opposite directions to positions respectively defining with one wall a rearwardly discharging orifice and with the other wall a laterally discharging orifice, the door partly defining the lateral orifice being located in all of the associated diverging branch and partly in the associated, parti-circular branch to thereby effect steering and forward movement of the craft.

14. A structure as defined in claim 11 wherein the slidable guidance is additionally provided by laterally spaced, parti-circular branches connecting at one end with the diverging branches and curving forward of the housing to terminate adjacent the side walls, all respectively, and means for positioning the doors between positions in which the rearwardly discharging orifice areas are varied to determine selected, forward speeds of the craft, and positions in which the doors partly define with the walls, respectively, orifices facing forwardly of the craft to determine astern movement thereof, the doors in the last named positions occupying substantial portions of the parti-circular branches, respectively.

15. A structure as defined in claim 14 wherein means is additionally provided, when the doors are in positions determining said astern movement of the craft, for moving the doors in opposite directions to place unequal portions of the doors in the respective parti-circular branches, the aft edge of one door defining with the adjacent wall a laterally facing orifice and the aft edge of the other door defining with its adjacent wall a forward facing orifice, the laterally facing orifice having a larger area than the forward facing orifice, whereby the jet stream moving through the larger orifice provides a steering thrust to the craft and the jet stream moving through the smaller orifice maintains astern movement of the craft.

16. A structure as defined in claim 14 wherein each door comprises a water resistant mass, a plurality of closely spaced bars embedded in and reinforcing the mass against transverse pressures, the opposite ends of the bars extending beyond the adjacent edges of the doors and the twin passages being partly defined by other walls forming a part of the housing and which walls include said grooves for guidably receiving the bar ends, all respectively, rotatable disks carried by the housing and having connections with the aft ends of the doors, respectively, a gear rotatable with each disk, and means for moving the doors fore and aft comprising a slide movable longitudinally of the housing, a rack meshing with each gear, and connections between the slide and racks whereby movement of the slide and racks in one direction effects movements of the doors in the opposite direction to vary said discharge orifices during forward and astern movements.

17. A structure as defined in claim 16 wherein means is additionally provided for moving the racks in opposite directions to thereby move each door in a direction opposite to the associated rack, the doors defining with the adjacent walls a laterally directed orifice and a forwardly directed orifice, all respectively, the laterally directed orifice having a greater area than the forwardly directed orifice, whereby the jet stream moving through the larger orifice provides a steering thrust to the craft and the jet stream moving through the smaller orifice maintains astern movement of the craft.

18. A reaction jet propulsion structure comprising a housing providing nozzle passage means through which a fluid medium is forced, the passage means being partly defined by a unitary substantially flat, slidable member whose aft portion defines a discharge orifice with the remainder of the passage means, the member being characterized by a flexing capability relative to the plane thereof throughout its length and rigidity against pressures acting transversely thereof, and means for guiding movements of the member to vary the area of the discharge orifice.

19. A structure as defined in claim 18 wherein the member comprises a water resistant mass, a plurality of closely spaced bars embedded in and reinforcing the mass against transverse pressure, the opposite ends of the bars extending beyond the adjacent edges of the member, respectively, and the nozzle passage means being partly defined by walls forming a part of the housing and which include grooves for receiving the bar ends to guide the sliding movements of the member.

References Cited by the Examiner

UNITED STATES PATENTS

| | | | |
|---|---|---|---|
| 1,572,812 | 2/1926 | Rees | 60—35.55 |
| 1,845,943 | 2/1932 | Thompson | 244—12 |
| 2,526,510 | 10/1950 | Smith. | |
| 2,544,642 | 3/1951 | Abbott | 115—12 X |
| 2,963,856 | 12/1960 | Caddell | 60—35.6 |
| 3,007,305 | 11/1961 | Hamilton | 60—35.54 |
| 3,044,258 | 7/1962 | Carlton et al. | 60—35.6 |
| 3,092,170 | 6/1963 | Ellis | 160—26 |

MARK NEWMAN, *Primary Examiner.*

SAMUEL LEVINE, *Examiner.*

T. J. BLUMENSTOCK, R. D. BLAKESLEE,
*Assistant Examiners.*